(12) United States Patent
Janisch

(10) Patent No.: US 6,871,624 B2
(45) Date of Patent: Mar. 29, 2005

(54) SNOWMOBILE REMOTE IGNITION SYSTEM

(75) Inventor: Darrel R Janisch, Thief River Falls, MN (US)

(73) Assignee: Arctic Cat, Inc., Thief River Falls, MN (US)

( * ) Notice: Subject to any disclaimer, the term of this patent is extended or adjusted under 35 U.S.C. 154(b) by 0 days.

(21) Appl. No.: 10/353,281

(22) Filed: Jan. 28, 2003

(65) Prior Publication Data

US 2004/0144351 A1 Jul. 29, 2004

(51) Int. Cl.[7] .................................................. F02N 11/08
(52) U.S. Cl. .................................... 123/179.2; 180/167
(58) Field of Search .......................... 123/179.2, 179.3, 123/179.4; 307/9.1, 10.3–10.6; 180/167; 290/37 A

(56) References Cited

U.S. PATENT DOCUMENTS

| | | | |
|---|---|---|---|
| 3,455,403 A | | 7/1969 | Hawthorne |
| 3,478,730 A | | 11/1969 | Bucher |
| 4,227,588 A | | 10/1980 | Biancardi |
| 4,446,460 A | | 5/1984 | Tholl et al. |
| 4,653,442 A | * | 3/1987 | Swenson ................. 123/179.3 |
| 5,435,408 A | * | 7/1995 | Sekinobu .................... 180/184 |
| 5,641,999 A | * | 6/1997 | Kawashima ............... 307/10.3 |
| 5,942,988 A | * | 8/1999 | Snyder et al. .............. 180/167 |
| 6,351,703 B1 | * | 2/2002 | Avery, Jr. ................. 123/179.2 |

* cited by examiner

*Primary Examiner*—Andrew M. Dolinar
(74) *Attorney, Agent, or Firm*—Merchant & Gould P.C.

(57) ABSTRACT

Herein is disclosed a snowmobile configured to start in response to a remote-start signal. One embodiment of the invention includes a snowmobile outfitted with a remote starting system. The remote starting system, itself, includes a remote starting activation switch that transmits a radio frequency signal to a remote starter module to initiate starting of an engine within the snowmobile. The remote starter module receives the radio frequency signal from the remote starting activation switch and, in response to receiving the radio frequency signal, initiates closure of a switch interposed between a battery and a starter motor, thereby causing the starter motor to crank and start the engine of the snowmobile.

35 Claims, 5 Drawing Sheets

SNOWMOBILE REMOTE IGNITION SYSTEM

FIELD OF THE INVENTION

The invention relates generally to personal recreational vehicles, and more particularly to a remote ignition system for use with engines that power personal recreational vehicles, such as snowmobiles and all-terrain vehicles.

BACKGROUND OF THE INVENTION

The snowmobile industry is competitive, requiring successful companies to continually create new snowmobile features, thereby creating a competitive advantage. A great deal of time and effort has been spent in making snowmobiles more comfortable and enjoyable for their riders. Consumers, in turn, appreciate these conveniences and develop brand loyalty.

One particular aspect of snowmobiling that serves as an inconvenience to consumers is the process of warming a snowmobile's engine. On particularly cold days, a snowmobile should be permitted to idle for as long as ten or fifteen minutes to allow its engine to warm; warm engine oil allows for better lubrication and, therefore, reduced engine wear. Additionally, a warm engine exhibits more complete combustion and better performance.

Heretofore, engine warming has involved the operator of the snowmobile trudging into the cold, starting his or her snowmobile, and staying with the snowmobile while it idled until warm. Additionally, the operator of the snowmobile may be required to wait for hand and thumb warmers to reach their proper temperature. This process is time consuming and needlessly subjects the operator to cold weather.

A snowmobile that eliminated the need for its operator to be physically present while starting and idling the snowmobile would be of great value to its operator. Such a snowmobile would allow its operator to immediately begin riding a warmed-up snowmobile, thereby doing away with the discouraging task of waiting for a cold engine to become warm. Further such a snowmobile could be programmed to automatically perform the task of periodically starting the engine, so as to keep the engine warm.

For the aforestated reasons, it is desirable to devise a means by which a snowmobile engine may be started in the absence of physical presence by its operator. Additionally, for both safety and theft prevention purposes, the scheme should ensure that the snowmobile is immobile while idling without its operator.

SUMMARY OF THE INVENTION

Against this backdrop, the invention has been created. One embodiment of the invention includes a snowmobile outfitted with a remote starting system. The remote starting system, itself, includes a remote starting activation switch that transmits a radio frequency signal to a remote starter module to initiate starting of an engine within the snowmobile. The remote starter module receives the radio frequency signal from the remote starting activation switch and, in response to receiving the radio frequency signal, initiates closure of a switch interposed between a battery and a starter motor, thereby causing the starter motor to crank and start the engine of the snowmobile.

According to another embodiment of the invention, the remote starting system includes a remote starting activation switch that transmits a radio frequency signal to a remote starter module to initiate starting of an engine. The remote starter module, itself, includes an antenna that receives the radio frequency signal transmitted by the remote starting activation switch. It also includes a radio frequency receiver in data communication with the antenna. The receiver receives the signal from the antenna and produces an activation signal in response to having received the signal from the remote starting activation switch. Furthermore, the remote starter module includes a processing unit in data communication with the receiver and with a memory unit. The memory unit is programmed with a set of instructions causing the processing unit to execute the following steps. Upon receiving the activation signal, the remote starter module initiates closure of a switch between a battery and a starter motor if there is an absence of a signal from an alternator, and if there is an absence of a speedometer signal. After lapse of a predetermined period of time, the remote starter module looks for a signal from the alternator to determine if the engine has started.

According to yet another embodiment of the invention, a remote starting method may involve the following steps. Upon receiving an activation signal, closure of a switch interposed between a battery and a starter motor is initiated under the condition that there is an absence of a signal from an alternator, and that there is an absence of a speedometer signal. Next, after lapse of a predetermined duration, a signal from the alternator is tested for, to determine if the engine has started.

DETAILED DESCRIPTION OF THE INVENTION

A snowmobile may be made to start in response to a signal transmitted from a remote starter switch. Thus, an operator of such a snowmobile may initiate transmission of an ignition-start signal, perhaps by pushing a button on a key chain-sized remote starter switch. In response to the ignition-start signal, a remote starter module (which is electrically integrated in the ignition system of a snowmobile) activates the starter motor to start the engine. The snowmobile can be left to idle, until the engine is warm. If the engine fails to start, the system may be designed to automatically progress through a pre-designated ignition re-try sequence.

Various security features unique to snowmobiles may be integrated into the remote starter system. For example, the system can be designed to detect motion of the snowmobile, and in response thereto, interrupt engine ignition if an appropriate driver authorization condition is not detected. One example of a driver authorization condition is the occurrence of the snowmobile's key being inserted in the ignition switch and turned to an "on" or "run" position (the inference being that the authorized driver must be present for the key to be inserted and turned "on"). Other examples of driver authorization conditions exist, including the occurrence of an appropriate access code being keyed into a keypad associated with the snowmobile, or the occurrence of a biometric test being successfully performed upon a would-be operator of the snowmobile.

Additionally, safety features peculiar to snowmobiles may be optionally integrated into the remote starter system. For example, the system may be designed to disable the remote starting capability if the snowmobile's hood is open. Also, the system may be designed to disable the remote starting capability if the engine is already running or if the snowmobile is in motion. Remote starting capability also can be disabled whenever the owner is detected as being present at the vehicle (e.g., the key is inserted in the engine and turned to the "on" or "run" position).

Figure 1:
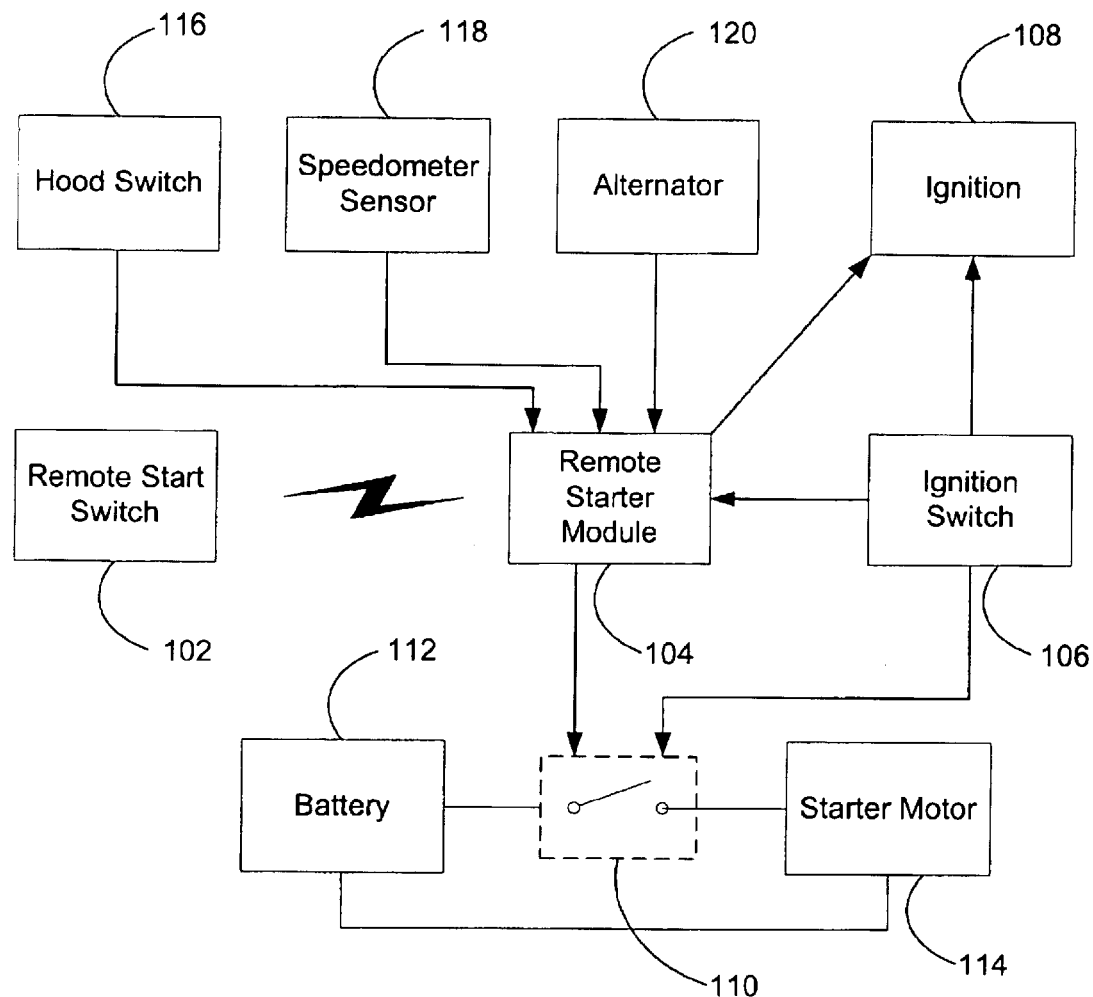
FIG. 1 depicts a schematic view of a remote ignition system for a snowmobile, in accordance with one embodiment of the invention.

FIG. 1 depicts a remote ignition system 100 for a snowmobile. The remote ignition system 100 includes a remote starter switch 102 and a remote starter module 104. The remote starter module 104 is in communication with an ignition switch 106 and an ignition system 108 of a snowmobile. The remote starter module 104 is also in communication with a switch 110 that is interposed between a battery 112 and a starter motor 114 of a snowmobile.

The remote starter switch 102 contains a radio frequency (RF) transmitter that emits an RF signal, for example, in response to depression of a button on the remote starter switch 102. The RF signal is received by the remote starter module 104, which reacts to reception of the signal by attempting to start the engine of the snowmobile. A remote starter switch 102 and a remote starter module 104 may be matched so that a second remote starter switch is incapable of activating the remote starter module 104. For example, a matching remote starter switch and remote starter module 104 may operate on a unique frequency or may share a unique code. Remote starter switches 102 with the above-described capabilities are known in the art.

During operation, the remote starter module 104 monitors the airwaves, seeking the presence of an RF signal from the remote starter switch 102. In response to detecting the sought-after RF signal, the remote starter module 104 causes the switch 110 to close, thereby completing a circuit between the battery 112 and the starter motor 114, causing the starter motor 114 to operate. Although not depicted in FIG. 1, the remote starter module 104 may communicate with other mechanisms of the snowmobile to accomplish the act of starting the snowmobile. For example, the remote starter module 104 may activate a solenoid (not pictured) for the purpose of positioning a gear to couple the starter motor 114 to the engine (not pictured). Additionally, the remote starter module 104 may activate an electronic fuel injection system (not pictured), which in turn activates a fuel pump (not pictured) to draw gasoline from a gas tank (not pictured) into the engine (not pictured).

As shown in FIG. 1, the remote starter module 104 is in communication with the ignition system 108. The ignition system 108 may include a snowmobile's engine (not pictured), a capacitor discharge ignition (not pictured), spark plugs (not pictured), and a high-voltage generating circuit (not pictured). During operation of the engine, the engine powers the capacitor discharge ignition, which transfers a high-voltage impulse to an appropriate spark plug, thereby ensuring ignition in the proper cylinder of the engine. The remote starter module 104 may communicate with a switch interposed at any point in the ignition system, thereby interrupting engine ignition and turning off the snowmobile.

The remote starter module 104 may interrupt engine ignition in response to various forms of stimuli, as described below with reference to FIGS. 3A and 3B.

The ignition switch 106 may be in communication with the remote starter module 104, so that when a key is inserted into the ignition switch 106 and turned to an "on" or "run" position, the remote starter module 104 becomes deactivated. Many possible embodiments of this arrangement exist. For example, insertion of a key into the ignition switch 106 followed by turning to the key to the "on" or "run" position may simply cut off power to the remote starter module 104. Similarly, insertion of a key into the ignition switch 106 and turning the key to the "on" or "run" position may initiate delivery of a command to the remote starter module 104, instructing the module 104 to power down or enter into an inactive state.

Figure 2:
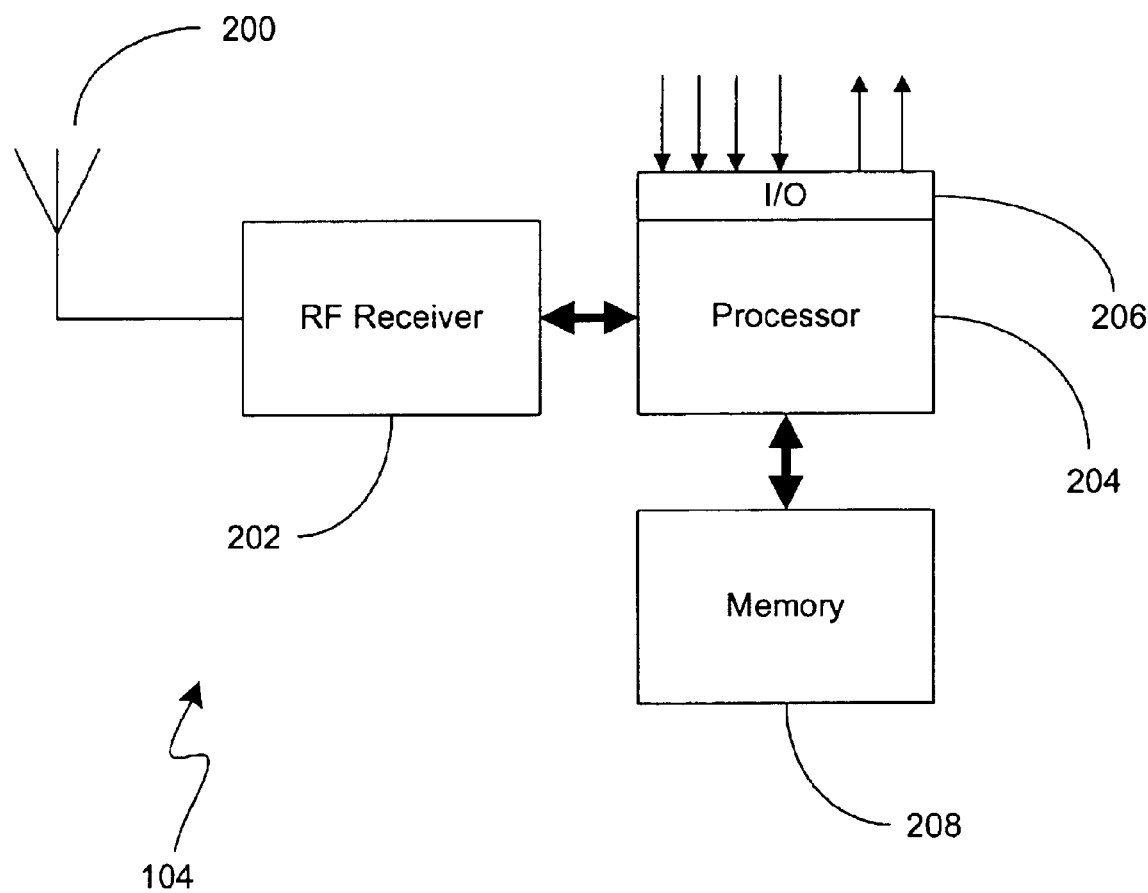
FIG. 2 depicts a block diagram of one possible embodiment of the remote starter module.

FIG. 2 depicts a block diagram of one possible embodiment of the remote starter module 104. The module 104 includes an antenna 200, which is coupled to an RF receiver 202. The RF receiver 202 receives an RF signal transmitted by the remote starter switch 102, recovers the baseband signal from the RF signal, and sends the signal to a processor 204 which validates the data and determines whether an appropriate ignition-start signal has been received. The processor 204 may be in data communication with various external input and/or output sources via input/output ports 206 (this is described in greater detail below). Further, the processor 204 is in data communication with a memory unit 208. The memory unit 208 stores software/firmware that governs the behavior of the remote starter module 104.

Figure 3A:
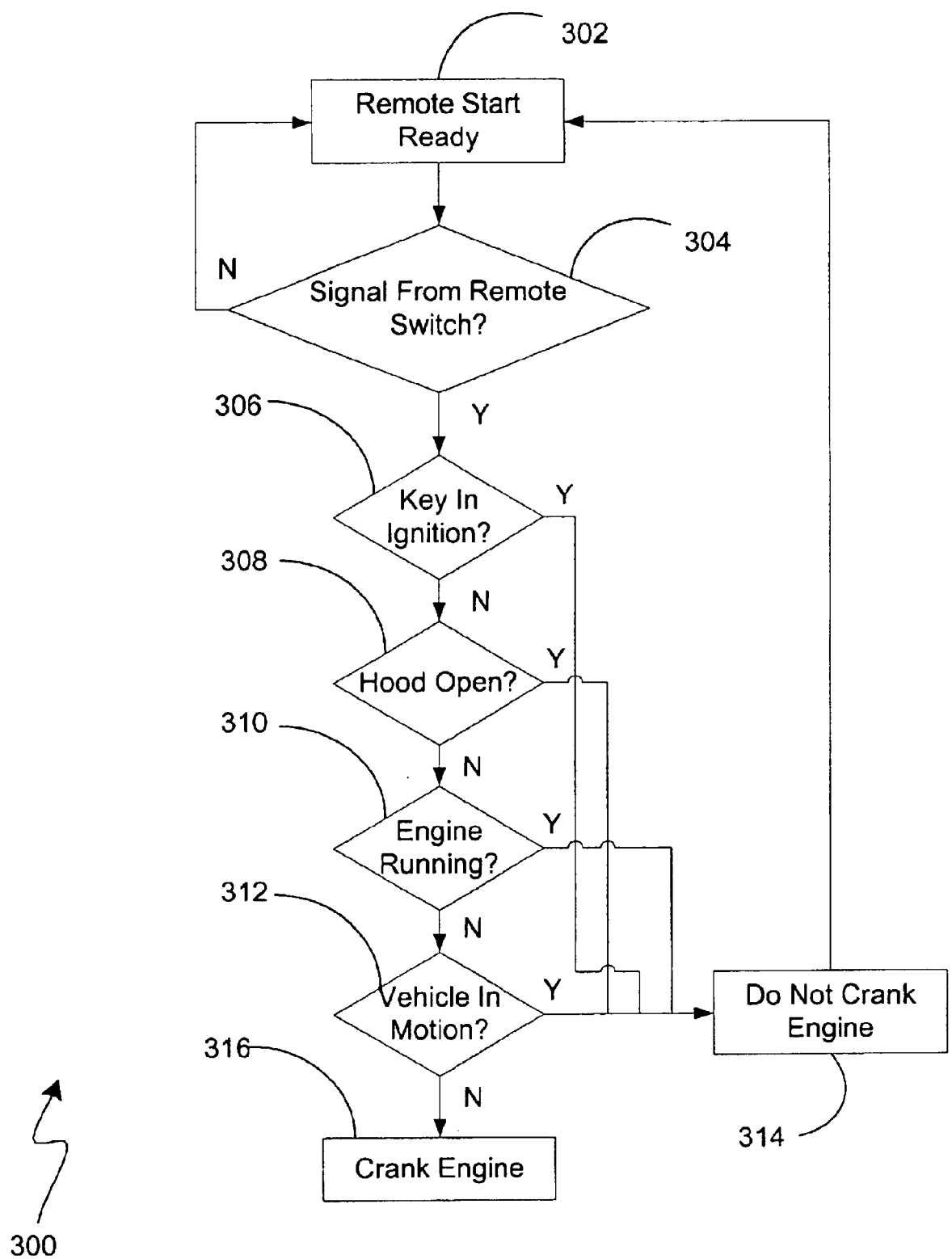
FIG. 3A depicts a remote ignition method, in accordance with one embodiment of the invention.
Figure 3B:
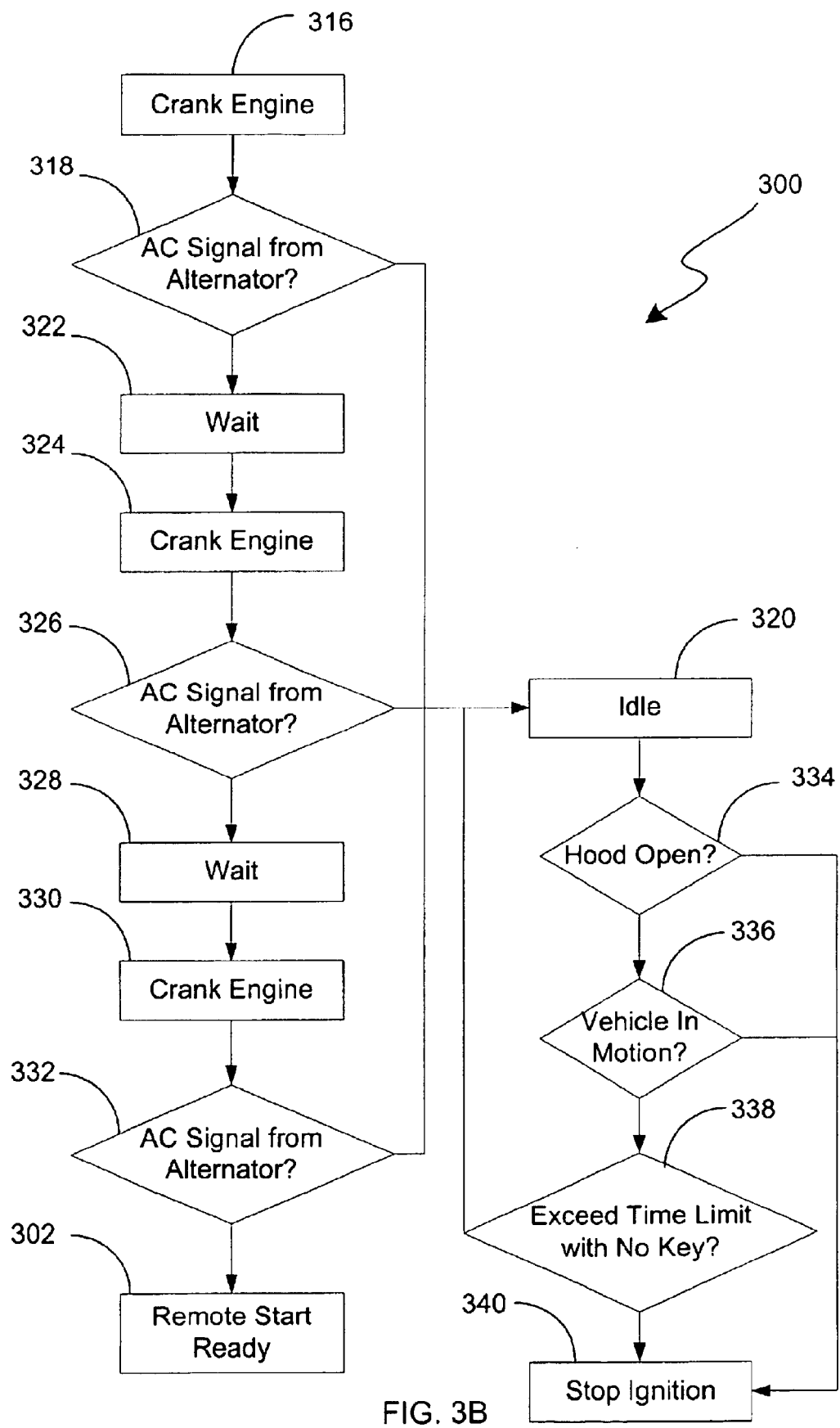
FIG. 3B depicts a remote ignition method, in accordance with one embodiment of the invention.

The following discussion with reference to FIGS. 3A and 3B describes a method that may be embodied in software/firmware stored in the memory unit 206 depicted in FIG. 2. The discussion assumes an embodiment of the remote ignition system 100 that includes the following input/output sources: (1) a hood switch 116 that indicates whether the engine hood (not pictured) of the snowmobile is open or closed; (2) a speedometer sensor 118 that transmits a signal indicating detected motion of the snowmobile; and (3) an alternator 120 that produces an alternating current (AC) signal in response to being powered by the snowmobile's engine (not pictured). The hood switch 116, speedometer sensor 118, and alternator 120 may communicate with the processor 204 via input/output ports 206. Additionally, intermediary signal-conditioning circuitry may be interposed between the processor 204 and the hood switch 116, speedometer sensor 118, or alternator 120. Of course, it will be understood by those of skill in the art that the input/output sources may communicate with the processor 204 by means other than use of input/output ports. For example, input/output sources may be in data communication with the processor 204 via a memory-mapping scheme, as is known in the art. Finally, the method depicted in FIGS. 3A and 3B is understood to be capable of implementation via construction of an application-specific integrated circuit (ASIC), rather than in firmware or software.

Together, FIGS. 3A and 3B depict a remote ignition method 300. As shown in FIG. 3A, the method 300 commences in a ready state 302, in which an ignition-start signal is awaited. In operation 304, a query is executed to determine if the ignition-start signal has been received. If the ignition-start signal has not been received, control returns to the ready state 302. Thus, operations 302 and 304 cooperate to form a loop, from which the ignition-start signal is the source of exit. Upon receiving the ignition-start signal, control is passed to a series of safety/security queries 306, 308, 310 and 312. These queries 306, 308, 310 and 312 may be performed in any order; the safety/security queries 306, 308, 310 and 312 prevent the snowmobile from being started under conditions that may be unsafe and/or unsecure.

As depicted in FIG. 3A, the first safety/security query 306 executed determines whether a key is inserted in the ignition switch 106 and turned to the "on" or "run" position. If a key is inserted and turned to the "on" or "run" position, the engine will not be cranked, as shown in operation 314, and control returns to the ready state 302. This query 306 is optional, and its purpose may be accomplished by simply cutting off power to, or otherwise bypassing, the remote starter module 104 when a key is inserted in the ignition switch 106 and turned to the "on" or "run" position. If no key is inserted in the ignition switch 106 and turned to the "on" or "run" position, control passes to query 308, in which it is determined whether the engine hood is ajar. This determination may be made by detecting the state of a hood switch 116. If the engine hood is ajar, the engine will not be cranked, as shown in operation 314, and control returns to the ready state 302. If, on the other hand, the engine hood is closed, control passes to query 310, in which it is determined whether the engine is already running. This determination may be made by looking for an AC signal emanating from the alternator 120. If the engine is already running, the engine will not be cranked, as shown in operation 314, and control returns to the ready state 302. Otherwise, control is passed to query 312, in which it is determined whether the snowmobile is in motion. One means of making this determination is discussed with reference to FIG. 4. If the snowmobile is in motion, the engine will not be cranked, as shown in operation 314, and control returns to the ready state 302. If the snowmobile is not in motion, the engine is cranked, as shown in operation 316 (depicted at the bottom of FIG. 3A and the top of FIG. 3B). As discussed previously, the process of cranking the engine may involve: (1) supplying energy to a starter motor 114; (2) supplying energy to a solenoid (not pictured) to position a gear (not pictured) that couples the starter motor 114 to the engine (not pictured); and (3) activating an electronic fuel injection system, which in turn activates a fuel pump to draw fuel from the fuel tank (not pictured) into the engine (not pictured). The length of time for which the engine should be cranked is an empirical matter that should be determined for each model of snowmobile independently. However, as an approximation, the engine may be initially cranked for 0.7 seconds.

Discussion of the remote ignition method 300 continues with reference to FIG. 3B, in which the engine crank operation 316 is depicted at the top. After the engine has been cranked in operation 316, control is passed to query operation 318, in which it is determined whether the engine has begun to run. This determination may be made by seeking an alternating current output emanating from the alternator 120. If the engine has, in fact, started, control is passed to idle state 320, in which the engine is permitted to idle. Otherwise, control passes to a wait state 322, after which the engine is again cranked, as shown in operation 324. The optimal amount of time to wait between attempts at cranking the engine varies from model to model and should be determined empirically. As an approximation, however, the wait duration may be approximately 5 seconds. Further, in one embodiment of the invention, the duration of cranking employed in operation 324 may be greater than that which is employed in operation 316. For example, if the engine was cranked for 0.7 seconds in operation 316, the engine may be cranked for 0.9 seconds in operation 324. After the engine has been cranked in operation 324, control is passed to query operation 326, in which it is determined whether the engine has begun to run. If the engine has begun to run, control is passed to idle state 320, in which the engine is permitted to idle. Otherwise, control passes to a wait state 328, after which the engine is again cranked, as shown in operation 330. Once again, the wait duration may be approximately 5 seconds. In one embodiment of the invention, the duration of cranking employed in operation 330 may be greater than that which is employed in operation 324. For example, if the engine was cranked for 0.9 seconds in operation 324, the engine may be cranked for 1.1 seconds in operation 330. As before, after the engine has been cranked in operation 330, control is passed to query operation 332, in which it is determined whether the engine has started. If the engine has started, control is passed to idle state 320, in which the engine is permitted to idle. Finally, if after the third attempt the engine fails to start, control is passed to the ready state 302, whereupon the remote starter module 104 again awaits reception of the ignition-start signal. Although the presently discussed embodiment describes an engine ignition re-try scheme involving three attempts at starting the engine, other numbers of re-tries may be employed and are within the scope of the invention.

While the engine is permitted to idle in operation 320, a series of safety/security queries 334, 336, and 338 are executed. These queries 334, 336, and 338 may be performed in any order; the safety/security queries 334, 336, and 338 prevent the snowmobile from continuing to run under conditions that are unsafe and/or unsecure. As depicted in FIG. 3B, the first safety/security query 334 executed determines whether the engine hood is ajar. As stated earlier, this determination may be made by detecting the state of a hood switch 116. If the engine hood is ajar, engine ignition is interrupted, as depicted in operation 340. The act of interrupting engine ignition may be accomplished by breaking the circuit created by the spark plugs, the capacitor discharge ignition system, and the high-voltage generator. On the other hand, if the engine hood is closed, control passes to operation 336, in which it is determined whether the snowmobile is in motion. As stated earlier, one means of making this determination is discussed with reference to FIG. 4. If the snowmobile is determined to be in motion, engine ignition is interrupted, as depicted in operation 340. Otherwise, control is passed to operation 338, in which it is determined whether the engine has been idling for a period longer than an idle threshold. If so, engine ignition is interrupted, as depicted in operation 340. The purpose of the idle threshold imposed by operation 338 is to prevent the engine from overheating by idling for too long. Thus, the idle duration should be determined empirically for each engine model. However, as an approximation, the idle duration may be no more than approximately 15 minutes. If the threshold has not been surpassed, control is returned to idle state 320, whereupon the engine is permitted to idle.

Although not explicitly depicted in FIG. 3B, the loop defined by operations 320, 334, 336, and 338 is traversed only for so long as a driver authorization condition is not detected. Once a driver authorization condition is detected (e.g., the key is inserted into the ignition and turned to the "on" or "run" position), the safety/security measures defined by the loop are no longer performed. For example, the ignition will not be killed (as shown in operation 336) in response to the snowmobile moving if a driver authorization event has been detected.

Figure 4:
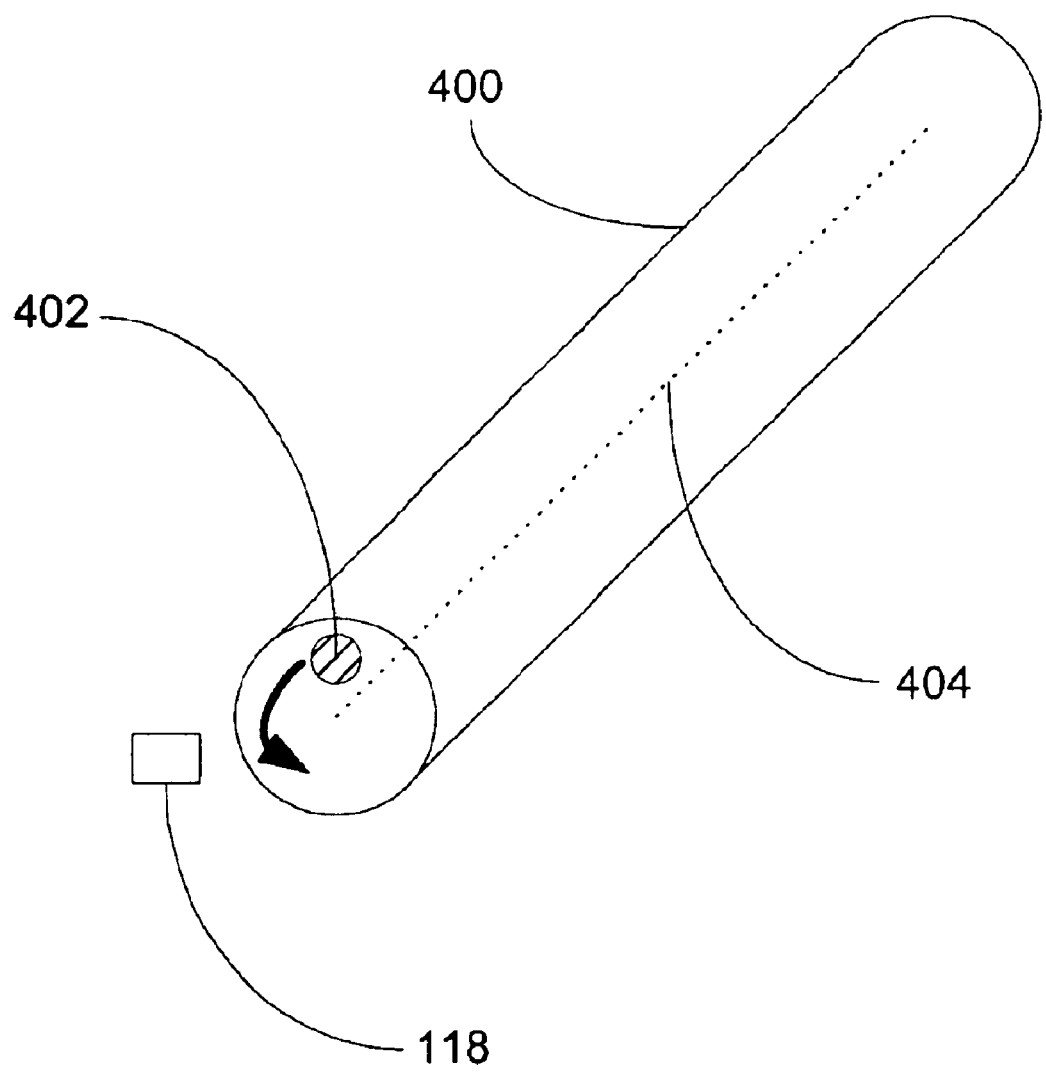
FIG. 4 depicts a speedometer sensor for detecting motion of a snowmobile.

As stated earlier, FIG. 4 depicts a system for detecting motion of a snowmobile. Depicted in FIG. 4 is a trackshaft 400, which is a shaft that drives a snowmobile's track, thereby propelling the snowmobile. Because the track and the trackshaft 400 are coupled, the trackshaft 400 rotates when the snowmobile is in motion. At the end of the trackshaft 400, offset from the longitudinal axis 404 of the trackshaft 400, is a magnet 402. Disposed at a fixed point in proximity to the trackshaft is a speedometer sensor 118. The speedometer sensor 118 possesses a magnetically sensitive element, which yields a signal that is a function of the magnetic field to which it is exposed. For example, the magnetically sensitive element may be a coil that generates a current in response to a change in magnetic flux through the coil. Alternatively, the magnetically sensitive element may be a magnetoresistor, the resistance of which is a function of the magnetic field to which it is exposed. Still further, the magnetically sensitive switch may be a Hall effect switch or a reed switch.

In periods in which the snowmobile is in motion, the trackshaft 400 rotates. The rotation of the trackshaft 400 changes the position of the magnet 402 relative to the speedometer sensor 118. Accordingly, the speedometer sensor 406 generates a signal with a characteristic (such as voltage, amperage, frequency, or duty cycle) that is approximately proportional to the rotation of the trackshaft 400 (which is, itself, approximately proportional to the velocity of the snowmobile). Thus, the signal returned by the speedometer sensor 118 indicates motion of the snowmobile; the signal is communicated to the remote starter module 104 (as shown in FIG. 1), for the purposes described with reference to FIGS. 3A and 3B.

It will be clear that the present invention is well adapted to attain the ends and advantages mentioned as well as those inherent therein. While presently preferred embodiments have been described for purposes of this disclosure, various changes and modifications may be made which are well within the scope of the present invention. For example, the ignition re-try sequency may contain fewer or greater number of attempts at cranking the engine. The engine may be cranked for either longer or shorter periods. Additional safety or security features may be employed, including the integration of an alarm that activates if the remote starter module detects motion of the snowmobile in the absence of a key being inserted in the ignition switch and turned to the "run" or "on" condition. Numerous other changes may be made which will readily suggest themselves to those skilled in the art and which are encompassed in the spirit of the invention disclosed and as defined in the appended claims.

The claimed invention is:

1. A snowmobile outfitted with a remote starting system, the system comprising:
   a remote starting activation switch that transmits a radio frequency signal to a remote starter module to initiate starting of an engine within the snowmobile; and
   a remote starter module that receives the radio frequency signal from the remote starting activation switch and, in response to receiving the radio frequency signal, causes the starter motor to crank and start the engine of the snowmobile;
   wherein the remote starter module interrupts engine operation in response to motion of the snowmobile, if a driver authorization condition is not detected.

2. The snowmobile of claim 1, wherein the driver authorization condition comprises a key having been inserted into an ignition switch and turned to an on or run position.

3. The snowmobile of claim 1, wherein the remote starter module interrupts engine operation in response to an engine hood being opened, if a driver authorization condition is not detected.

4. The snowmobile of claim 3, wherein the driver authorization condition comprises a key having been inserted into an ignition switch and turned to an on or run position.

5. The snowmobile of claim 1, wherein the remote starter module interrupts engine operation in response to a threshold quantity of time having lapsed without a driver authorization condition being detected.

6. The snowmobile of claim 5, wherein the driver authorization condition comprises a key having been inserted into an ignition switch and turned to an on or run position.

7. The snowmobile of claim 5, wherein the threshold quantity of time corresponds to a period of time required for the engine to overheat from idling.

8. The snowmobile of claim 1, further comprising:
   a sensing circuit that detects motion of a drivetrain component and generates an output signal in response thereto;
   wherein the output signal is provided to the remote starter module; and
   wherein the remote starter module interrupts engine operation in response to reception of the output signal indicative of motion of the drivetrain component, if a key is not inserted into an ignition switch and turned to an on or run position.

9. The snowmobile of claim 1, further comprising
   an alternator driven by the engine, the alternator outputting an alternating current signal in response to being driven by the engine;
   wherein the remote starter module executes steps of:
      cranking the engine for a first threshold period of time;
      after expiration of the first threshold period of time, looking for the alternating current signal from the alternator; and
      in response to an absence of the alternating current signal from the alternator, cranking the engine for a second threshold period of time.

10. The snowmobile of claim 9, wherein the remote starter module further executes steps of:
    after expiration of the second threshold period of time, looking for the alternating current signal from the alternator; and
    in response to an absence of the alternating current signal from the alternator, cranking the engine for a third threshold period of time.

11. The snowmobile of claim 1, wherein the remote starter module detects the presence of an alternating current signal emanating from an alternator, and in response to detecting the signal, fails to initiate the closure of the switch between a battery and a starter motor of the snowmobile.

12. The snowmobile of claim 1, further comprising:
    a hood switch that produces an output having a first state indicating a closed hood and a second state indicating an open hood; and
    wherein the remote starter module detects the state of the hood switch, and in response to detecting an open hood, fails to initiate the closure of the switch between a battery and a starter motor of the snowmobile.

13. A method of remote starting of a snowmobile, the method comprising:
    (a) upon receiving an activation signal, initiating for a predetermined initial, duration, closure of a switch interposed between a battery and a starter motor, if the following conditions are met
       (i) there is an absence of a signal from an alternator;
       (ii) there is an absence of a speedometer signal;

(iii) there is a signal indicating a hood is closed; and (b) after lapse of the initial predetermined duration, testing for the signal from the alternator to determine if the engine has started.

14. The method of claim 13, wherein the closure of the switch interposed between the battery and the starter motor is predicated upon an additional condition:

absence of a key inserted into an ignition switch used for activating the starter motor, the key being turned to the on or run position.

15. The method of claim 13, further comprising:

(c) in response to an absence of a signal from the alternator, waiting for a predetermined period of time;

(d) initiating, for a duration longer than the initial predetermined duration, the closure of the switch interposed between the battery and the starter motor; and (e) testing for the signal from the alternator to determine if the engine has started.

16. The method of claim 13, further comprising:

(c) interrupting engine ignition in response to an engine hood becoming ajar, if a key is not inserted into an ignition switch used for activating the starter motor and turned to an on or run position.

17. The method of claim 13, further comprising:

(c) interrupting engine ignition in response to a threshold quantity of time having lapsed without a key having been inserted into an ignition switch used for activating the starter motor and turned to an on or run position.

18. A snowmobile outfitted with a remote starting system, the system comprising:

a remote starting activation switch that transmits a radio frequency signal to a remote starter module to initiate starting of an engine within the snowmobile; and a remote starter module that receives the radio frequency signal from the remote starting activation switch and, in response to receiving the radio frequency signal, causes the starter motor to crank and start the engine of the snowmobile;

wherein the remote starter module interrupts engine operation in response to an engine hood being opened, if a driver authorization condition is not detected.

19. The snowmobile of claim 18, wherein the driver authorization condition comprises a key having been inserted into an ignition switch and turned to an on or run position.

20. The snowmobile of claim 18, wherein the remote starter module interrupts engine operation in response to a threshold quantity of time having lapsed without a driver authorization condition being detected.

21. The snowmobile of claim 20, wherein the driver authorization condition computes a key having been inserted into an ignition switch and turned to an on or run position.

22. The snowmobile of claim 20, wherein the threshold quantity of time corresponds to a period of time required for the engine to overheat from idling.

23. The snowmobile of claim 18, further comprising:

a sensing circuit that detects motion of a drivetrain component and generates an output signal in response thereto;

wherein the output signal is provided to the remote starter module; and wherein the remote starter module interrupts engine operation in response to reception of the output signal indicative of motion of the drivetrain component.

24. The snowmobile of claim 18, further comprising:

an alternator driven by the engine, the alternator outputting an alternating current signal in response to being driven by the engine;

wherein the remote starter module executes steps of:

cranking the engine for a first threshold period of time;

after expiration of the first threshold period of time, looking for the alternating current signal from the alternator; and in response to an absence of the alternating current signal from the alternator, cranking the engine for a second threshold period of time.

25. The snowmobile of claim 24, wherein the remote starter module further executes steps of:

after expiration of the second threshold period of time, looking for the alternating current signal from the alternator, and in response to an absence of the alternating current signal from the alternator, cranking the engine for a third threshold period of time.

26. The snowmobile of claim 18, wherein the remote starter module detects the presence of an alternating current signal emanating from an alternator, and in response to detecting the signal, fails to initiate the closure of the switch between a battery and a starter motor of the snowmobile.

27. The snowmobile of claim 18, further comprising:

a hood switch that produces an output having a first state indicating a closed hood and a second state indicating an open hood.

28. A snowmobile outfitted with a remote starting system, the system comprising:

a remote starting activation switch that transmits a radio frequency signal to a remote starter module to initiate starring of an engine within the snowmobile; and a remote starter module that receives the radio frequency signal from the remote starting activation switch and, in response to receiving the radio frequency signal, causes the starter motor to crank and start the engine of the snowmobile;

wherein the remote starter module interrupts engine operation in response to a threshold quantity of time having lapsed without a driver authorization condition being detected.

29. The snowmobile of claim 28, wherein the driver authorization condition comprises a key having been inserted into an ignition switch and turned to an on or run position.

30. The snowmobile of claim 28, wherein the threshold quantity of time corresponds to a period of time required for the engine to overheat from idling.

31. The snowmobile of claim 28, further comprising:

a sensing circuit that detects motion of a drivetrain component and generates an output signal in response thereto;

wherein the output signal is provided to the remote starter module; and wherein the remote starter module interrupts engine operation in response to reception of the output signal indicative of motion of the drivetrain component.

32. The snowmobile of claim 28, further comprising:

an alternator driven by the engine, the alternator outputting an alternating current signal in response to being driven by the engine;

wherein the remote starter module executes steps of:

cranking the engine for a first threshold period of time;

after expiration of the first threshold period of time, looking for the alternating current signal from the alternator; and in response to an absence of the alternating current signal from the alternator, cranking the engine for a second threshold period of time.

33. The snowmobile of claim 32, wherein the remote starter module further executes steps of:

after expiration of the second threshold period of time, looking for the alternating current signal form the alternator; and in response to an absence of the alternating current signal from the alternator, cranking the engine for a third threshold period of time.

34. The snowmobile of claim 28, wherein the remote starter module detects the presence of an alternating current signal emanating from an alternator, and in response to detecting the signal, fails to initiate the closure of the switch between a battery and a starter motor of the snowmobile.

35. The snowmobile of claim 28, further comprising:

a hood switch that produces an output having a first state indicating a closed hood and a second state indicating an open hood.

* * * * *